United States Patent [19]

Schreiber

[11] Patent Number: 4,761,641
[45] Date of Patent: Aug. 2, 1988

[54] INFORMATION DISPLAY SYSTEM
[75] Inventor: Craig A. Schreiber, Best, Netherlands
[73] Assignee: Vidcom Rentservice B.V., Bodegraven, Netherlands
[21] Appl. No.: 459,975
[22] Filed: Jan. 21, 1983
[51] Int. Cl.⁴ ............................................... G09G 1/16
[52] U.S. Cl. ..................................... 340/717; 340/720; 340/815.31; 340/703; 358/87; 350/96.1
[58] Field of Search ............ 340/705, 717, 720, 752, 340/757, 815.12, 815.15, 815.27, 815.31, 736, 742, 784; 358/87, 250, 251, 252, 254; 350/287

[56] References Cited

U.S. PATENT DOCUMENTS

| | | | |
|---|---|---|---|
| 2,983,835 | 5/1961 | Frey, Jr. ............................ | 358/92 X |
| 3,095,475 | 6/1963 | Brake ................................. | 358/251 |
| 3,289,196 | 11/1966 | Hull ................................... | 340/721 |
| 3,425,768 | 2/1969 | Kuhn et al. ....................... | 350/287 |
| 3,498,864 | 3/1970 | Ogle . | |
| 3,537,096 | 10/1970 | Hatfield ............................ | 340/721 |
| 3,623,069 | 11/1971 | Malden ............................. | 340/717 |
| 3,623,789 | 11/1921 | Kawazu ............................ | 350/576 |
| 3,641,558 | 2/1972 | Cook et al. ....................... | 340/717 |
| 3,641,559 | 2/1972 | Hogan et al. ..................... | 340/717 |
| 3,644,922 | 2/1972 | James et al. ...................... | 340/757 |
| 3,644,935 | 2/1972 | Lourie ............................... | 340/717 |
| 3,668,381 | 6/1972 | Schwartz et al. ................ | 350/287 X |
| 3,757,040 | 9/1973 | Bennet et al. .................... | 358/104 X |
| 3,777,059 | 12/1973 | Wilkey, Jr. ....................... | 340/717 X |
| 3,851,093 | 11/1974 | Sunstein .......................... | 358/251 X |
| 3,878,329 | 4/1975 | Brown .............................. | 340/705 X |
| 3,887,791 | 6/1975 | Kitchens .......................... | 340/757 X |
| 3,909,525 | 9/1975 | Fagan ............................... | 358/87 X |
| 3,914,761 | 10/1975 | Murase et al. .................... | 340/815.17 |
| 3,941,926 | 3/1976 | Slobodzian et al. . | |
| 3,963,326 | 6/1976 | Buchert ........................ | 340/815.31 X |
| 3,963,327 | 6/1976 | Poirier .............................. | 350/287 |
| 4,009,335 | 2/1977 | Payne et al. ..................... | 358/240 |
| 4,121,206 | 10/1978 | Lemire ............................. | 340/815.12 |
| 4,254,408 | 3/1981 | Kerscher, III .................... | 340/815.12 |
| 4,263,594 | 4/1981 | Masucci ........................... | 340/815.31 |
| 4,330,813 | 5/1982 | Deutsch ........................... | 340/784 X |
| 4,349,815 | 9/1982 | Spooner ........................... | 340/755 X |
| 4,349,817 | 9/1982 | Hoffman et al. ................. | 340/815.31 X |
| 4,354,205 | 10/1982 | Love et al. ....................... | 358/250 |
| 4,367,464 | 1/1983 | Kurahashi et al. .............. | 340/752 X |
| 4,368,485 | 1/1983 | Midland .......................... | 340/720 X |
| 4,386,345 | 5/1983 | Narveson et al. ............... | 340/745 X |
| 4,414,565 | 11/1983 | Shanks ............................. | 358/250 X |
| 4,439,760 | 3/1984 | Fleming .......................... | 340/717 X |
| 4,471,385 | 9/1984 | Hyatt ............................... | 358/254 X |
| 4,484,187 | 11/1984 | Brown et al. .................... | 340/750 X |

FOREIGN PATENT DOCUMENTS 2558704 7/1977 Fed. Rep. of Germany .
2919047 11/1980 Fed. Rep. of Germany .
2008351 5/1979 United Kingdom .

OTHER PUBLICATIONS

Space Redistribution of Optical Image With Light Conducting Fiber Bundle for Color T.V. Pickup Tube, Ward F. Davidson, Jr., RCA TN No. 136.

Primary Examiner—Marshall M. Curtis
Attorney, Agent, or Firm—Fred Wiviott

[57] ABSTRACT

An information display system comprising a computer device having at least one input member for receiving video information and a processor member connected to said input member for processing and/or controlling digital video information contained in and/or obtained from the video information received from the input member and/or digital video information produced by the computer device itself in order to produce display data and control-signals, a communication channel comprising a data bus connected to the processor member of the computer device and a control bus for the transmission of the display data and the control-signals respectively, a memory device connected to the data bus for storing display data received from the data bus, a memory control-device connected to the control bus for controlling the storage of display data in and reading stored display data from the memory device in response to control-signals received from the control bus, a digital/analogue converting device connected to the memory device for producing analogue display signals during reading of the memory device and at least one display panel consisting of a plurality of electronic display units arranged side by side in a manner such that the respective display surfaces together constitute the display surface of the display panel.

25 Claims, 6 Drawing Sheets

INFORMATION DISPLAY SYSTEM

The invention relates to an information display system.

The invention intends to provide a system which is particularly suitable for displaying video information on large screens.

For this purpose the invention provides a system for displaying video information on a large screen which is characterized in that it comprises a computer device having at least one input member for receiving video information and a processor member connected to the input member for processing and/or controlling digital video information contained in and/or obtained from the video information received from the input member and/or digital video information produced by the computer device itself in order to produce display data and control-signals, a communication channel having a data bus connected to the processor member of the computer device and a control bus for the transmission of the display data and the control-signals respectively, a memory device connected to the data bus for storing display data received from the data bus, a memory-control device connected to the control-bus for controlling the storage of display data in and reading the stored display data from the memory device in response to the control-signals received from the control-bus, a digital-analogue conversion device connected to the memory device for producing analogue display signals during reading of the memory device and at least one display panel consisting of a plurality of electronic display units arranged side by side in a manner such that the respective display locations together constitute the display surface of the display panel.

The display surface of the display panel may vary between, for example, 2 ms$^2$ and 200 ms$^2$ or more, whilst the depth of the display panel remains the same, for example, 50 cms, independently of the size. Preferably the display panel is formed by arranging a plurality of display tubes side by side in a frame.

The system embodying the present invention might be designated a super-macro-image television.

By means of the system embodying the present invention television programmes, video programmes and/or information programmes can be displayed on a large screen. Video programmes may be received from a video pick-up or a video camera.

Thanks to the computer device tests, logo's and amination images can be written on the display surface of the display panel. The information may be included both separately and simultaneously in the current television or video programme. Moreover, the information can be directly written by a keyboard on the display surface or directly by means of pre-programmed video cassettes.

The above summary is not limitative.

Briefly stated, an image can be displayed on a large scale, whilst a plurality of images can be combined into one large image to be displayed. The display panel has a very high resolution and a high luminance exceeding many times that of a normal television image. This means that the display panel can be used also in daylight.

In order to protect the display surface of the display panel it may be provided at the front with a transparent perspex sheet. The system embodying the invention is particularly suitable for advertising, video performances, information transmission, film display or combinations of these possibilities.

Finally it is an advantage of the system embodying the present invention that displays can be true to time and various effects can be obtained such as repetitions, slow-down representations, close-ups and so on.

The invention will now be described in detail with reference to the drawing, in which.

Figure 1:
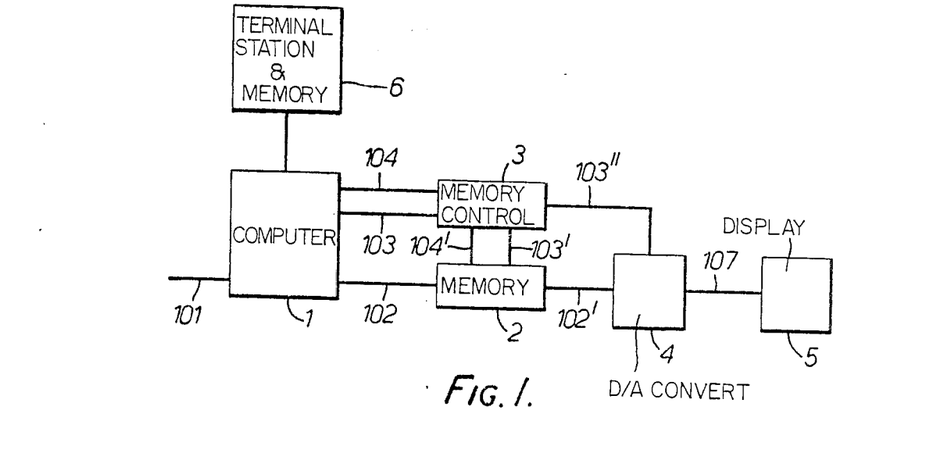
FIG. 1 shows a highly simplified block diagram of the system embodying the invention.

FIG. 1 shows a highly simplified block diagram of the information display system in accordance with the invention. Reference numeral 1 designates a computer device having a video input 101 and being connected to a data bus 102, a control-bus 103 and an address-bus 104. The computer device may furthermore be connected to marginal apparatus 6, for example, a terminal station and a memory for video information to be displayed produced by the computer device. The digital video information produced by the computer device may or may not be displayed together with the received video information processed or not processed and being of digital, analogous nature of a combination thereof on a display panel. For this purpose the system embodying the invention comprises at least one display panel 5, a memory device 2, a memory control-device 3 and a digital/analogue conversion device 4. The digital display data of the computer device are transmitted through the data bus to the memory device, whereas the address and control-signals of the computer are transmitted by means of the address bus and the control-bus respectively to the memory control-device 3. The memory control-device 3 generates control-dignals on a line 103' to control the memory device 2 and control-signals on a line 103" to control the digital/analogue converter 4, which receives display data signals through a line 102'. Finally the digital/analogue converter 4 passes analogue display signals through a line 107 to the display panel 5.

As stated above, the video information received by the computer device 1 may be of a digital or analogue nature or a combination thereof. In this regard the video input of the computer 1 may be connected to a member capable of detecting the nature of the incoming video information and/or to an analogue/digital converter for converting incoming analogue video information into digital video information. Moreover, the computer 1 may have separate inputs for analogue and for digital video information.

The memory control-device 3, the memory device 2 and the digital/analogue conversion device 4 may each comprise a single device or a plurality of such devices, each of the members co-operating with different display panels 5.

According to the invention each display panel 5 consists of a plurality of electronic display units 52 (FIG. 2) each having a reproducing surface 53. The electronic display units are arranged side by side in the frame 51 of the display panel in a manner such that the respective display surface 53 together constitute the display surface of the display panel, the latter surface being marked by a dot-and-dash outline designated by reference numeral 56.

Figure 2:
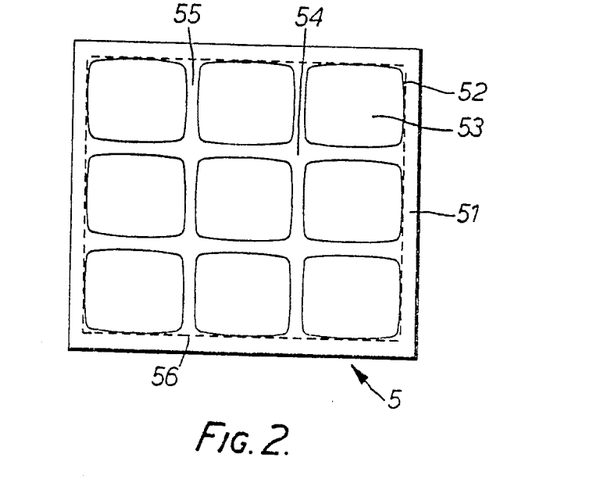
FIG. 2 is a front view of the panel of the system embodying the present invention.

The display surface of the display panel may be flat or curved, for example, corresponding with the curvatures of the display tubes employed.

Since the display panel 5 is composed of identical units, replacement can be carried out in a simple manner.

With respect to each display panel 5 the memory device 2, the memory control-device 3 and the digital/analogue converter 4 comprise at least one individual member for each electronic display unit of the display panel. When the incoming video information is at least compatible with the interlaced colour television system, each memory device 2 and memory control-device 3 may comprise for each electronic display member two respective members and the digital/analogue converter 4 may comprise for each colour two respective members, i.e. in the case of colour signals, six digital/analogue converting members. The system embodying the invention may, of course also be designed for the sole reproduction of black-white video information, whilst the system may furthermore be designed for multiple interlacing.

One of the most important faculties of the system embodying the invention is that the computer device 1 processes video information received at the input 101 in a manner such that this information, which is reproducible with the aid of a single electronic display unit 52 can now be displayed on a display panel 5 of considerably larger dimensions by partial images contained in said video information to be displayed on one individual electronic display unit of the display panel in a manner such that by allotting partial images to defined electronic display units the same image is formed, but of much larger dimensions and improved resolution. The display panel may even be composed of 400 display screens or television display tubes, each of which is capable of displaying a partial image 1/400th the original image, electronically magnified to the dimensions of the original image size. The system embodying the present invention might, therefore, be termed an image magnifying system. Owing to the digital processing the resolution is, however, not adversely affected in contrast to the effect of optical means.

A further possibility of the system embodying the invention resides in using a number of electronic display units 5 of continuous display surfaces for reproducing an original image on an enlarged scale and using remaining electronic display members for reproducing additional video information generated by the computer 1 itself and/or introduced with the aid of a terminal station and a memory.

It will be obvious that the system embodying the invention encompasses numerous possibilities of use in many domains.

Figure 3:
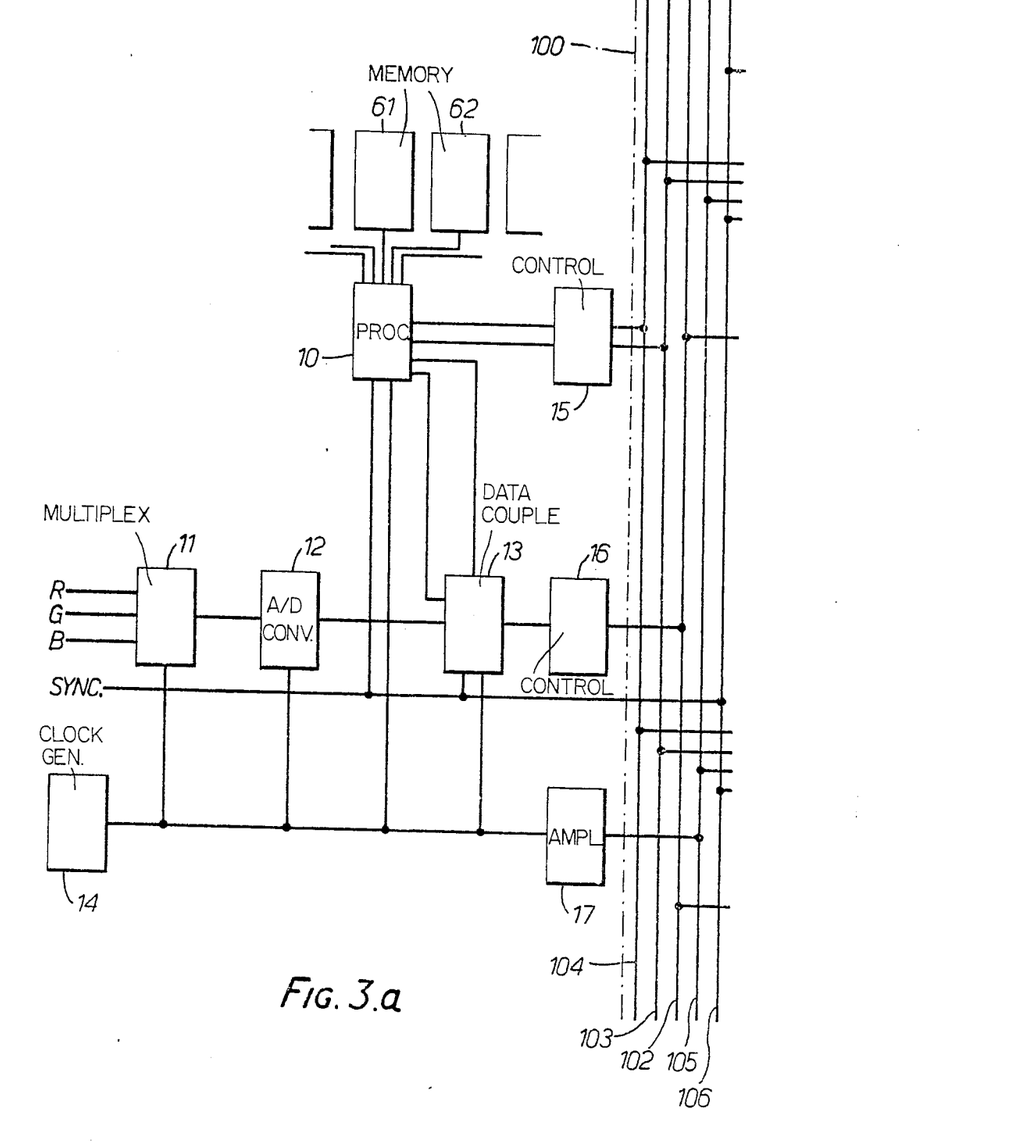
FIGS. 3a and 3b show block diagrams in further detail of the system embodying the present invention, which is in particular compatible with the known television system and the display panel is composed of display tubes.
Figure 3B:
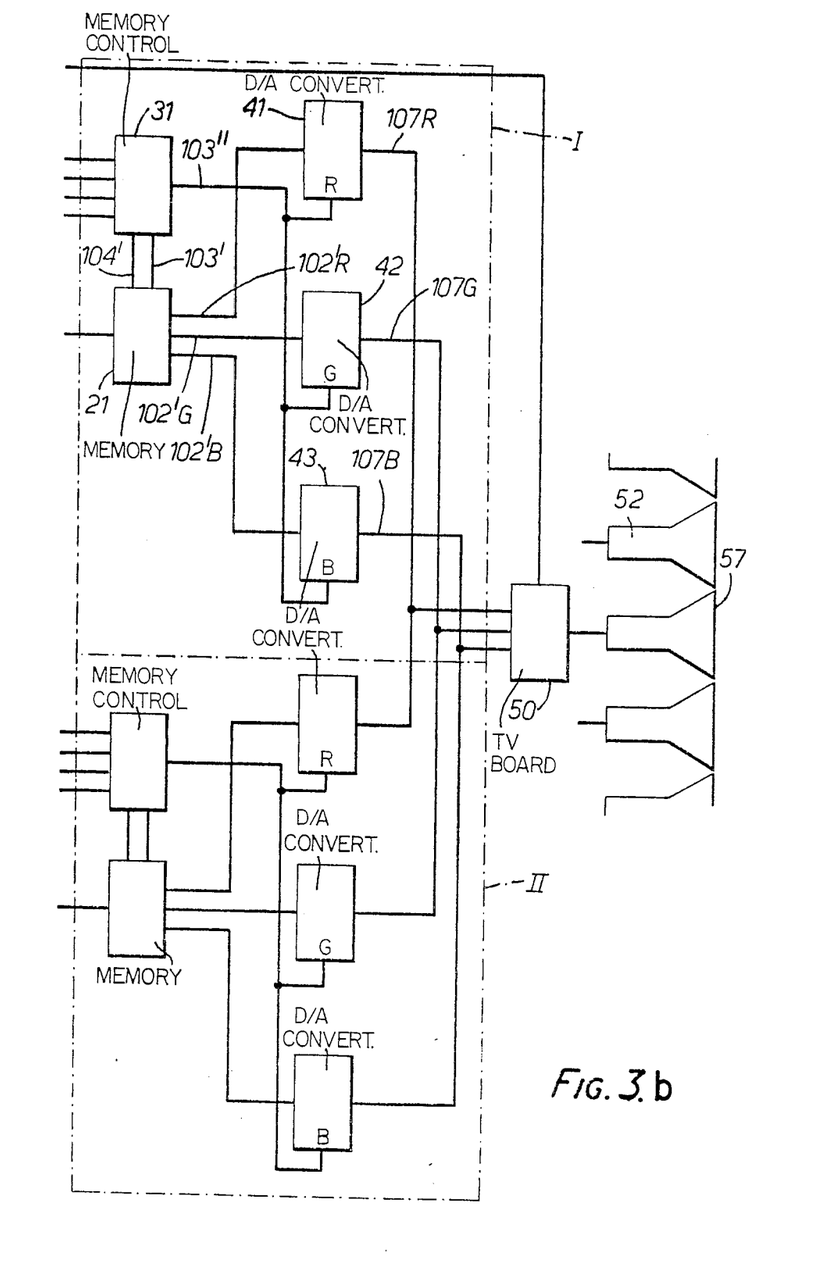

FIG. 3 shows the block diagram of FIG. 1 more in detail for the case in which the received video information consists of analogue colour signals and a synchronizing signal and in which furthermore the interlacing system is employed.

Referring to FIG. 3 the computer device 1 comprises a processor member 10, a multiplexer 11, an analogue/digital converting member 12, a data coupling member 13, a clock generator 14, control-members 15 and 16 and an amplifier 17. The computer device 1 is furthermore connected to marginal apparatus such as a terminal station 61 and a memory 62.

Of the memory and the memory control-device is shown only that part which co-operates with one electronic display unit, in particular, comprising a colour display tube 57 and a television board 50. In view of the interlacing system the memory, the memory control and the digital/analogue converter are doubled for each electronic display unit. For the sake of ease only one part indicated by a dot-and-dash outline designated by reference symbol I will be described hereinafter.

The computer device of FIG. 3 is coupled to the other components of the system shown in FIG. 1 including a memory member 2, a memory control-member 3 and three digital/analogue converting members for each raster of a half image to be displayed on the display tube of each electronic display unit. The memory member 2, the memory control-member 3 and the digital/analogue converting member 4 may, however, be designed so that in common for the rasters of an image to be displayed on the display tube of each electronic display unit 5 there are provided only one memory member 2, one memory control-member 3 and three analogue/digital converting members 4, the memory member having double the capacity of the memory members of FIG. 3 in case of duplicate interlacing. The respective memory control-members 3 control the memory members 2 in a manner such that when one half of a memory member is read and displayed synchronously herewith on the respective display tube, the other half of the memory is written or supplemented. In case of the double structure of FIG. 3 the electronic implementation is simpler than in the other case mentioned above as a result of the less complex control-requirements.

In case of said double structure it is preferred for each electronic diaply unit 52 to comprise a display tube or a different screen member and three insertable printed circuits, one print having the required electronic means for generating at least one electron beam in the case of a display tube, for sucking off the electron beam(s) and for controlling the instantaneous intensity thereof and a second print and, preferably, a third print identical to the second print having each a memory member 2, a memory control-member 3 and a number of digital/analogue converting members 4 equal to the number of electronic beams. The display panel is composed in this case of identical units.

The memory member 2 and the memory control-member 3 are connected by means of a communication channel 100 to the computer device. The communication channel 100 comprises the above-mentioned data bus 102, the control-bus 103 and the address-bus 104 and apart therefrom a clock-bus 105 and a synchronisation-bus 106.

The communication channel may comprise cables, infrared or fibre-optical ways.

The clock generator 14 produces a clock signal and applies the same to the multiplexer 11, the analogue/-digital converting member 12, the processor member 10, the data coupling member 13 and by means of the amplifier 17 to the clock-bus.

The clock generator 14 produces sampling pulses of a frequency as high as is required for display with a large bandwidth input.

The incoming video information includes the colour video signals red, green and blue, which are applied to the multiplexer 11 and a synchronizing signal applied to the processor member 10, the data coupling member 13 and the synchronizing bus 106. The colour video signals multiplexed by the multiplexer 11 are digitalized in the analogue/digital converter 12 and then applied to the data coupling member and subsequently to the processor member in order to process the data concerned in accordance with a programme or instructions furnished by the terminal station 61 and/or the memory 62. This processing can be concerned with a processing of the incoming video information, but also with the combination thereof with internally generated video information. By means of control-members 16 the data coupling member 13 provides display data to the data bus 102. It is not necessary to provide invariably one driving member for each electronic display unit. In a specific case, for example, one driving member may be used for three electronic display units. The same applies to the driving members 15, which pass the address and control signals of the processor member to the control-bus. Finally the processor member applies furthermore a control-signal to the data coupling member.

Each memory control-member 31 is connected to the address bus 104, the control-bus 103, the clock-bus 105 and the synchronisation bus 106. Each memory member 21 is connected to the data bus and receives through the line 104' address signals and through the line 103' control-signals from the memory control-member 31 concerned. The digital/analogue converting members 41, 42 and 43 for red, green and blue respectively receive through the line 103" a fly-back suppression signal from the memory control-member 31 and through the lines 102R, 102G and 102'B respectively the respective display data and in turn they apply through the lines 107R, 107G and 107B analogue display signals to the television board 50, which board is also connected to the synchronization bus, which means that all display screens 57 are synchronously scanned or written.

A memory control-member 31 is selected by an address and each memory member 21 receives instructions by means of the data and control-bus. The further data address signals are video information. The data are stored in the memory in accordance with the address.

Reading of the memory members is synchronized by the synchronizing signal contained in the incoming video information.

The control is furthermore such that reading synchronous with the scan of the first interlacing part I supplements the second interlacing part II.

Visual improvement is obtained by writing the second interlacing on the edges of the image dots of the first interlacing.

The system embodying the invention comprises at least one display device having a large screen controlled by a computer device. The object of the system according to the present invention is to display video information and information processed and controlled by a computer device on large surfaces. In synchronism with the image display sound may, of course, be reproduced.

Referring to the display panel 5 as shown by way of example in FIG. 2 it is assumed that the electronic display members comprise cathode-ray tubes or display tubes 52. The following part of this description is in particular concerned with the perfection of the visual impression, that is to say, the impression that the display panel 5 functions as a single screen, whilst the display surface is formed by the respective discrete surfaces 53 of the display tubes 52. This involves that a solution has to be found for the discontinuities 54 and 55 resulting from the side-by-side arrangement of the display tubes 52. These discontinuities can be minimized by disposing the display tubes 52 as near one another as possible. For that matter, the discontinuities in smaller panels will be more disturbing than in large panels, since the viewing distance from the panel is larger in the latter case. A further problem of the display panel in the system embodying the invention may reside in that, as is known, the front faces of the display tubes are curved. This problem is particularly involved when the display tubes are mounted, so to say, in a flat plane.

A solution for the two above-mentioned problems is found in the use of flat, transparent Fresnel lenses preferably having more than 60 grooves/cm.

In front of the front side of each display tube 52 is disposed a Fresnel lens in a manner such that the image displayed by the respective display tube is magnified to an extent such that the respective images of partial images join one another and are transformed in a flat plane determined by the Fresnel lenses. In practice it has been found that this solution is particularly suitable for small display panels.

A solution for the problem of obtaining co-planar images displayed by the various display tubes 52 is particularly related to the display tubes themselves.

Figure 4:
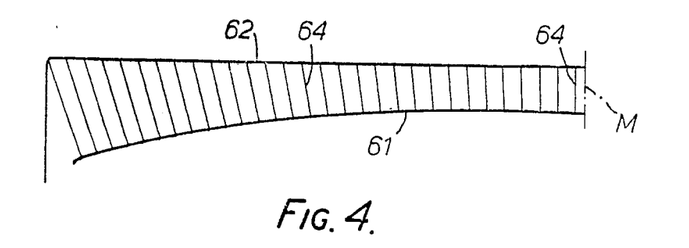
FIG. 4 shows a detail of a display tube of the panel embodying the invention, FIGS. 5A, B, C illustrate the use of prisms in the display panel in accordance with the invention.

FIG. 4 shows a detail of a display tube to be used in the panel in accordance with the invention. With the exception of the front side of the display tube it is a conventional one. The centre line of the display tube is designated by M and the screen is designated by reference numeral 61. The screen 61 is a curved surface having phosphor trios in the case of colour display tubes. The front side of the display tube designated by reference numeral 62 is flat and adjoins the curved outer face of the screen 61. In the front plate are included optical fibres i.e. at least one fibre per colour phosphor trio in a manner such that at the centre the fibre or fibres is (are) at right angles to both the screen 61 and the front face 62, whereas towards the outside the fibres spread in fan-like fashion as is clearly shown in FIG. 4. The fibres themselves are designated by reference numeral 64. Briefly stated, the fibres 64 transform the curved surface of the screen 61 into a flat surface 62. Owing to the flat structure of the front plates of the display tubes they can be arranged more closely to one another, whilst the remaining interstice, at least at the level of the front plate, can be filled out with an elastic filler, for example, silicone cement. The advantage of using at least partly transparent silicone cement is that the silicone cement will absorb to some extent the radiation of the front plates between which it is sandwiched so that the aforesaid discontinuities are at least less conspicuous and under favourable conditions they will not attract the attention.

Figure 5A:
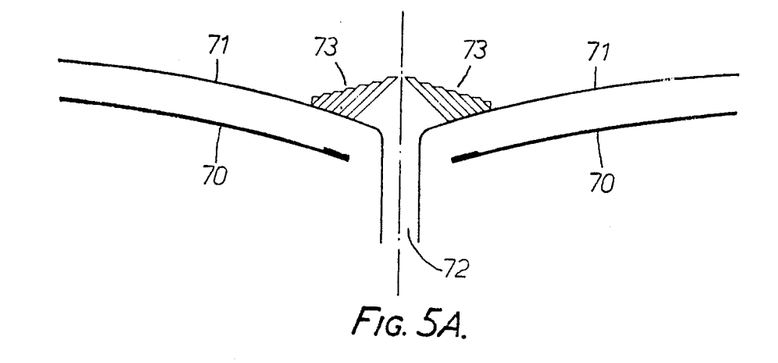
Figures 5B, 5C:
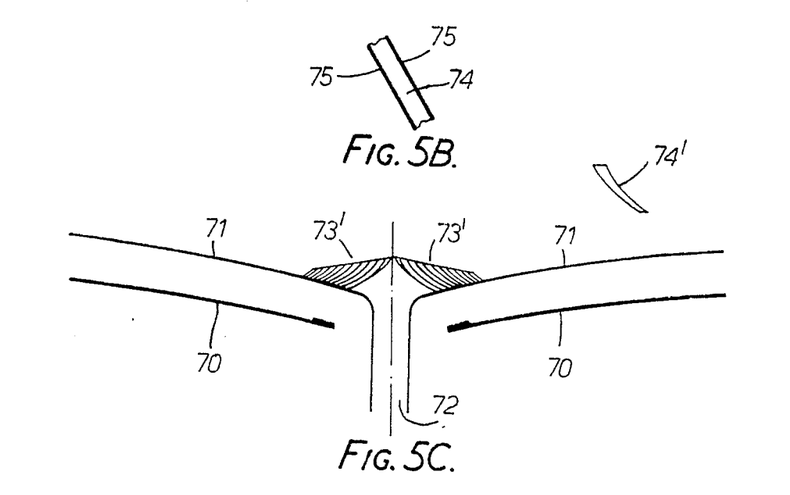

A further solution of the problem involved in the discontinuities is found in the use of prisms specifically designed for this purpose as shown in FIGS. 5A, B, C.

Referring to FIGS. 5A, C reference numeral 70 designates the screen of a conventional display tube having a curved front plate 71. In the side-by-side arrangement of the display tubes 70 gaps 72 are formed, which give rise to the aforesaid discontinuities. At the periphery of the front plate 71 of the display tube 70 are placed prisms 73, 73' so that the prisms arranged on neighbouring display tubes co-operate with one another as is indicated in FIGS. 5A, C.

FIG. 5B shows an optically transparent bar 74 or light guide, which has reflective layers on the long sides, for example a metal foil 75. The bars are disposed in re-entrant positions one on the other. The effect of the prisms is based on the principle of light conduction by reflection at the walls. The bars 74 are thus arranged at an angle to the front plate 71 of the display tube 70. In other words, the effect of the prisms is based on total reflection in a parallel transparent body. In fact filling out the discontinuities in the display is not based on information transmission but on the transmission of colour and luminance or else the colour and light/dark effect on the screen. The continuity is thus essentially obtained as a confused image. Furthermore, the cross-sectional areas of the bars 74 may be related to the size of the image dot.

FIG. 5C illustrates the use of conical light conductors 74' in the prisms 73'. The light conductors are arranged in contact with one another and adjoin the front plate 71 of the display tube and are in line with one another on the other side of the prism in a manner such that they are directed in positions opposite to the curvature of the front plate 71 of the display tube.

Figure 6:
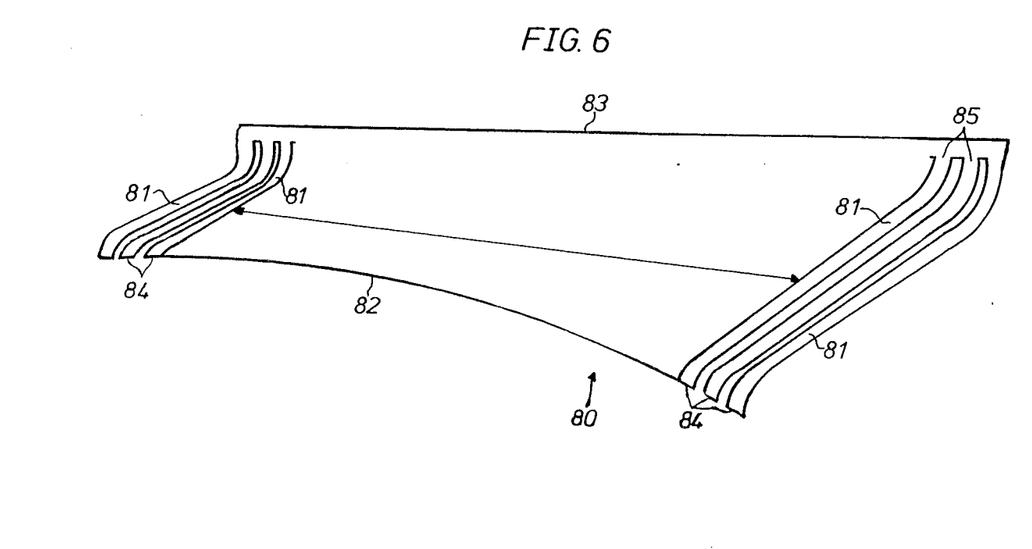
FIG. 6 shows a wedge shaped optical member according to the present invention.

Still another solution for the two above-mentioned problems, which in fact is analogous to the solution of the FIG. 4 embodiment, but then applied to the exterior of the face plate of a conventional cathode ray tube, is found in the application of wedge shaped optical members as the one shown in FIG. 6. The wedge shaped optical member 80 consists of a plurality of serpentine or elongated S-shaped light guides 81, which on one side 82 engage the face plate of the cathode ray tube, whilst the other side determines a part of the plane face of the display panel. Therefore one side 82 of the wedge shaped optical member 80 is curved, in conformity with the curvature of the face place of the cathode ray tube, whilst the other side 83 is linear. The input openings 84 of each light guide 81 are normal to the corresponding area of the curved face plate of the cathode ray tube, whilst the output openings of each light guide 81 are normal to the face of the display panel.

Now referring to FIG. 7 it will be explained in what manner the wedge shaped optical members 80 are applied to the face plate of the cathode ray tube in order to remove said above two problems.

Figure 7:
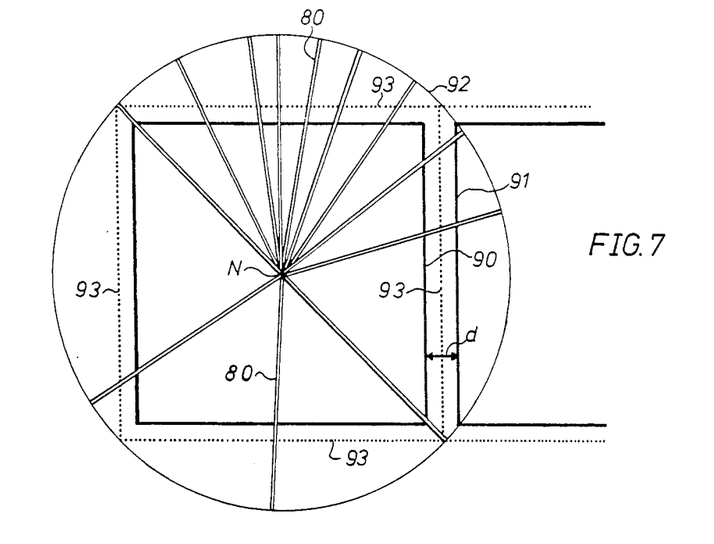
FIG. 7 is a front view of a part of the panel, wherein the wedge shaped optical members are attached to the display units of said panel.

In FIG. 7 the face plate of a certain cathode ray tube of the panel is indicated by reference numeral 90, whilst the face plate of the neighbouring cathode ray tube is indicated by the reference numeral 91. The gap existing between said face plates 90 and 91 is indicated by the reference symbol d. Although the application of the wedge shaped optical members 80 to the cathode ray tubes is described with respect to a particular face plate 90, it should be understood, that the same operation should be applied to all face plates of the cathode ray tubes of the display panel.

From the centre N of the face plate 90 a plurality of wedge shaped optical members 80 are placed radially and side by side on said face plate and attached thereto. In fact the spherical surface of the face plate is transformed thereby in a flat surface, bounded by a circle 92.

Assuming that the discontinuity between the display units is the gap d between the face plates, the wedge shaped optical members 80 should for example cover half said gap d, that is to say, should extend to the dotted lines 93. Therefore after the application of the wedge shaped optical members to the face plate, the same are cut, so that the circular boundary is transformed into a rectangular boundary.

Figure 8:
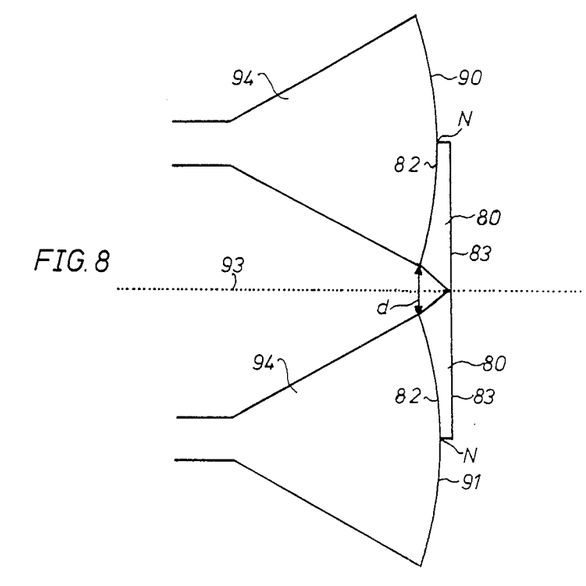
FIG. 8 shows a sectional view of a part of the panel, wherein the wedge shaped optical members are applied to the face plate of the cathode ray tubes thereof.

Eventually in FIG. 8 the filling up of the gap d is shown in section. Reference numeral 94 indicates the cathode ray tubes, whilst the reference numeral 90 indicates the face plate of one of those cathode ray tubes and reference numeral 91 indicates the face plate of the other cathode ray tube. With the reference numeral 80 the wedge shaped optical members are indicated and again the middlepoint of the face plate 90 is indicated by the reference symbol N.

I claim:

1. An information display system characterized in that it comprises a computer device having at least one input member for receiving video information and a processor member connected with said input member for processing or controlling digital video information contained in or obtained from the video information received from the input member or digital video information generated by the computer device itself in order to produce display data, control signals and address signals; a communication channel having a data bus, a control bus and an address bus connected to the processor member of the computer device for the transmission of the display data, the control signals and the address signals, respectively; at least two memory means connected to the data bus for storing the display data received from the data bus; at least two memory control means connected to the control bus and the address bus for controlling the storage of display data in and for reading the stored display data from the memory means in response to control signal from the control bus; a digital/analog converting device connected to the memory means for producing analog display signals while the memory control means is reading the stored display data; and at least one display panel consisting of a plurality of discrete electronic display units arranged side by side in a manner such that respective display surfaces together constitute the display surface of the display panel, the electronic display units are each coupled to the digital/analog converting device for being scanned in synchronism and for receiving individual display signals; said processor member comprising first means for processing video information and second means for generating address signals so that the at least two memory means are selectively connectable to a different one of the individual electronic display units whereby an image may be displayed on each display unit which is distinct in form from the images displayed by the other display units and comprising a recognizable portion of a composite picture and whereby the synchronous scanning of said display units is capable of providing a composite image which is the combination of the distinct individual images of said discrete display units.

2. An information display system as claimed in claim 1 characterized in that the computer device further comprises an analogue/digital converting member connected to the input member and to the processor member for digitalizing analogue video signals contained in the incoming video information and applying the digitalized analogue video signals to the processor member.

3. An information display system as claimed in claim 1 characterized in that all electronic display units of the display panel display an original image contained in the video information received from the input member.

4. An information display system as claimed in claim 1 characterized in that the electronic display units of the display panel display a discrete portion of a combined display of both an original image contained in the video information received from the input member and the video information internally produced by the computer device.

5. An information display system as claimed in claim 4 characterized in that a number of the electronic display units of the display panel co-operate for displaying an original image contained in the video information received from the input member and in that the remaining number of electronic display units of the display panel co-operate for displaying the video information internally produced in the computer device.

6. An information display system as claimed in claims 1 or 2 in which the incoming video information contains analogue black/white or colour video signals consisting of red, green and blue signals and synchronizing signals characterized in that the input member comprises a multiplexer sub-member connected to the analogue/digital converting member for multiplexing the black/white video signal or the red, green and blue video signals and for applying the multiplexed signal to the analogue/digital converting member, the communication channel comprising synchronization bus for the transmission of synchronizing signals, the input member being operative to pass the synchronizing signal to the processor member the synchronization bus and the memory control members, the electronic display units being connected to the synchronization bus, and the digital/analogue converting device being connected to each memory member, said digital to analog converting device comprising a digital/analogue converter for black/white video signals or a digital/analogue converter for red, green and blue video signals.

7. An information display system as claimed in claim 6 in which incoming video information contains interlaced television video signals characterized in that each electronic display unit comprises a display tube, a display member for producing at least one electron beam, means for deflecting the electron beam(s) and means for controlling the instantaneous intensity thereof and for each raster of a half image there is a memory member, a memory control member and digital/analogue converting members for black/white or color video signals, each memory control member being operative to produce fly-back suppressing signal for each digital/analogue converting member.

8. An information display system as claimed in claims 1 or 2 in which each display unit comprises a display tube which includes a screen having a center portion end an outer periphery, a front plate having a first side contacting the screen and a second side, characterized in that the first side of the front plate is shaped in conformity with the screen of the display tube and the second side is flat and optical fibres provided in the front plate and extend from the side of the front plate adjoining the screen to the flat side of the front plate in a manner such that they spread in fan-like fashion from the centre portion of the screen towards the periphery of the screen to the flat side of the front plate.

9. An information display system as claimed in anyone of claims 1 or 2 in which each display unit of the panel comprises a display tube having a front plate whereby there is an imageless gap between the front plates of the display tubes characterized in that prisms are arranged at the circumference of the front plate of each display tube in a manner such that they optically fill out the imageless gaps between the respective front plates of the plurality of display tubes of the display panel.

10. An information display system as claimed in claim 9 characterized in that the prisms of neighbouring display tubes substantially adjoin one another.

11. An information display system as claimed in claim 9 characterized in that each prism is formed by a plurality of transparent bars separated from one another by a layer of reflective material, each of the bars having a first side engaging the display tube and an opposite side which is relatively off-set outwardly toward the periphery of the display tube.

12. An information display system as claimed in claim 9 characterized in that each prism is formed by a plurality of relatively adjoining conical light conductors.

13. An information system as claimed in claim 12 characterized in that the light conductors are arranged so that the prism adjoins on one side of the front plate of the display tube and are in line on the other side, said line being directed opposite the curvature of the front plate of the display tube.

14. An information display system as claimed in claims 1 or 2 in which each display unit comprises a display tube having a face plate which includes a centre portion and an outer margin, there being discontinuities between adjacent face plates, characterized in that a plurality of light guides are attached to the exterior surface of the face plates of each display tube in a manner such that they spread in fan-like fashion from the centre portion of the face plate towards the outer periphery of the face plate, said light guides having input openings defining a first plane and outlet openings defining a second plane, wherein the plane of the input openings of the light guides are normal to its associated face plates and the planes of the output openings are normal to the viewing plane and define a generally rectangular, flat viewing surface, filling up at least a part of the discontinuities between neighbouring display tubes.

15. An information display system as claimed in claim 14, wherein the face plates are curved and have a central area characterized in, that the light guides are serpentine or elongated S-shaped, and a certain number of said light guides form a wedge shaped optical member having one side linear and the other side is curved in conformity with the curvature of the face plate of the cathode ray tube, there being a plurality of said wedge shaped members attached to said face plate and extending radially outwardly from the middlepoint thereof, the lengths of said members being sized so that their outer ends define a generally rectangular boundary so that at least a part of the discontinuities between the neighbouring face plates or display units is filled up.

16. An information display system as claimed in claim 2 characterized in that for each electronic display unit the memory means and the memory control means comprises at least one memory member and memory control member respectively, the communication channel also comprising an address bus connected to the processor member, and each memory member is connected to the data bus and each memory control-member is connected to the control bus and the address bus, and the processor member comprising first means for processing video information and second means for generating address signals in a manner such that at least two memory members are connected to individual electronic display units so that a processed part of at least the video information received from the input member is stored and that the electronic display units concerned co-operate at least for displaying an original image contained in the video information received at the input member.

17. An information display system as claimed in claim 6 in which each display unit comprises a display tube having a face plate which includes center portion and a periphery, a plurality of light guides are attached to the exterior surface of the face plates of each display tube in a manner such that they spread in fan-like fashion from the centre of the face plate towards the periphery of the face plate, said light guides having input openings which define a first plane and outlets openings which define a second plane, wherein the plane of the input openings of the light conductors are normal to the relative parts of the face plate and the planes of the output openings of the other light conductors are normal to the viewing plane and define a generally rectangular flat viewing surface, and filling up at least a part of the discontinuities between neighbouring display tubes.

18. An information display system as claimed in claim 17, wherein the face plates of the display tubes are curved and have a central area the light being serpentine or elongated S-shaped, and a certain number of said light guides form a wedge shaped optical member having one side is linear and the other side is curved in conformity with the curvature of the face plate of the cathode ray tube, there being a plurality of said wedge shaped members attached to said face plate and extending radially outwardly from the central area thereof, the lengths of the members being sized so that their outer ends define a rectangular boundary so that at least a part of the discontinuities between the neighbouring face plates or display units as filled up.

19. An information display method which employs a system having a computer device provided with at least one input member coupled to receive video information and a processor member connected to the input member, a communication channel having a data bus and a control bus connected to the processor member of the computer for conducting data signals, control signals and address signals, at least two memory devices connected to the communication channel for receiving the data signals, at least two memory control devices connected to the memory device communication channel for receiving the control and address signals, a digital to analogue converting device connected to the memory device and a display panel consisting of a plurality of electronic display units arranged side by side in a manner such that the respective display surfaces together constitute the display surface of the display panel, the individual display units being coupled to the digital to analogue converting device and being constructed and arranged to individually display a complete image, the steps of: processing in said computer processing member digital video information contained in video information received at the input member or digital video information generated by the computer device itself, transmitting the display data over the communications channel to the memory device and storing the display data in the memory device; transmitting the control and address signals over the communications channel to the memory control device; controlling the storage of display data in the memory devices and reading the same by the respective memory control device in response to the control and address signals received over the communcations channel; producing analogue display signals from the display data stored in each memory device while the memory control devices are reading the memory devices; and scanning the display units in synchronism and selectively connecting the display units to the memory units to generate an individual discrete display image in a plurality of display units which are distinct in form from the images displayed on the other display units whereby the units are capable of defining a composite image comprising a combination of the discrete individual images of the individual display units.

20. An information system comprising a plurality of display units each having a display screen defined by an outer periphery, the display screen of said plurality of display units being disposed in a side-by-side manner to provide a viewing matrix, there being gaps between the display screens of adjacent units, a plurality of light guides mounted on each of said display screens and each having a first end in contact with the peripheral portion of said screen, said light guides extending generally outwardly from the display screens and having a second end spaced from the screens to define a light transmitting structure which is generally fan-shaped in cross sections and having its narrower portion in contact with the surface of the display screens and with the generally wider portion of the structure projecting toward the gaps between adjacent display units to converge toward the light guides of adjacent units to provide image information in the gap between units.

21. An information display system characterized in that it comprises a computer means having at least one input circuit means for receiving video information and a processor circuit means connected with said input circuit means for processing or controlling digital video information contained in or obtained from the video information received from the circuit means or digital video information generated by the computer device itself in order to produce display data and control and address signals, at least two memory circuit means connected to the processor circuit means for storing the display data, at least two memory control circuit means connected to the process circuit means and to the memory circuit means for controlling the storage of display data in and for reading the stored display data from the memory circuit means in response to the control and address signal received from the processor circuit means, digital/analogue circuit means connected to the memory circuit means for producing analogue display signals while the memory control circuit means are reading the stored display data, and at least one display panel consisting of a plurality of discrete electronic display units each having display surface arranged side by side in a manner such that the respective display surfaces together constitute the display surface of the display panel, said electronic display units each being constructed and arranged to individually display a complete image distinct in form from the images displayed by the other display units, said display units being scanned in synchronism whereby a composite image may be provided comprising a combination of the individual image portions of said discrete display units.

22. The information system set forth in claim 21 wherein the display units each has a display screen defined by a outer periphery, the display screens of said plurality of display units being disposed in a side-by-side manner to provide a viewing matrix, there being gaps between the display screens of adjacent units, and a plurality of spaced apart light guides attached to each of said display screens, said light guides being generally S-shaped and substantially homogenious, said light guides extending generally outwardly from said display screens and toward the gaps between adjacent display units.

23. An information display system as claimed in claim 21 characterized in that the electronic display units of the display panel display a discrete portion of a combined display of both an original image contained in the video information.

24. An information display systen as claimed in claim 21 in which each display unit comprised a display tube having a face plate having a center and a periphery, a plurality of light guides attached to the exterior surface of the face plates of each display tube in a manner such that they spread in fan-like fashion from the center of the face plate towards the periphery of the face plate said light guides having input openings defining a first plane and outlet openings defining a second plane, wherein the plane of the input openings of the light conductors are normal to the relative parts of the face plate and the planes of the output openings of the other light conductors are normal to the viewing plane and define a generally rectangular, flat viewing surface, and filling up at least a part of the discontinuities between neighbouring display tubes.

25. An information display system as claimed in claim 23 wherein the face plates of the display tubes are curved, the light guides being serpentine or elongated S-shaped, and a certain number of said light guides form a wedge shaped optical member having one side is linear and the other side is curved in conformity with the curvature of the face plate of the cathode ray tube, there being a plurality of said wedge shaped members attached to said face plate and extending radially outwardly from the center area thereof, the lengths of the lengths of the members being sized so that their outer ends define a rectangular boundary so that at least a part of the discontinueties between the neighbouring face plates or display units is filled up.

* * * * *